United States Patent
Gao et al.

(10) Patent No.: US 9,819,437 B2
(45) Date of Patent: Nov. 14, 2017

(54) ROGUE OPTICAL NETWORK UNIT MITIGATION IN PASSIVE OPTICAL NETWORKS

(71) Applicant: Futurewei Technologies, Inc., Plano, TX (US)

(72) Inventors: Bo Gao, Wuhan (CN); Yuanqiu Luo, Cranbury, NJ (US); Frank Effenberger, Colts Neck, NJ (US); Jianhe Gao, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/379,650

(22) Filed: Dec. 15, 2016

(65) Prior Publication Data

US 2017/0163370 A1    Jun. 8, 2017

Related U.S. Application Data

(63) Continuation of application No. 14/693,602, filed on Apr. 22, 2015, now Pat. No. 9,525,506.

(Continued)

(51) Int. Cl.
*H04J 14/00* (2006.01)
*H04J 14/02* (2006.01)
(Continued)

(52) U.S. Cl.
CPC .......... *H04J 14/0236* (2013.01); *H04B 10/27* (2013.01); *H04B 10/572* (2013.01); *H04J 14/0249* (2013.01)

(58) Field of Classification Search
CPC .. H04J 14/0228; H04J 14/023; H04J 14/0235; H04J 14/0236; H04J 14/0238; H04J 14/0239; H04J 14/0252
See application file for complete search history.

(56) References Cited

U.S. PATENT DOCUMENTS

2014/0161456 A1* 6/2014 Sugawa ............. H04J 14/0227
398/72

FOREIGN PATENT DOCUMENTS

| CN | 103841474 A | 6/2014 |
| WO | 2012136155 A1 | 10/2012 |
| WO | 2013189321 A1 | 12/2013 |

OTHER PUBLICATIONS

McGarry, M, et al. "An Evolutionary WDM Upgrate for EPONs," Jan. 1, 2005, pp. 1-24.*

(Continued)

*Primary Examiner* — Daniel Dobson
(74) *Attorney, Agent, or Firm* — Conley Rose, P.C.

(57) ABSTRACT

An optical line terminal (OLT) comprises a target OLT channel termination (CT), and a source OLT CT in communication with the target OLT CT, wherein the source OLT CT is configured to exchange tuning messages with the target OLT CT to initiate upstream wavelength tuning of an optical network unit (ONU), wherein the source OLT CT is configured to transmit a tuning request to the ONU after the tuning messages have been exchanged and to receive a tuning acknowledgement message from the ONU indicating that the tuning request will be executed, wherein the source OLT CT is configured to transmit a broadcast notification message to all OLT CTs within the OLT, except for the source OLT CT, after receipt of the tuning acknowledge message from the ONU, and wherein the broadcast notification message includes a tuning time of the ONU.

20 Claims, 4 Drawing Sheets

Related U.S. Application Data

(60) Provisional application No. 61/986,601, filed on Apr. 30, 2014.

(51) Int. Cl.
    *H04B 10/27*    (2013.01)
    *H04B 10/572*   (2013.01)
    *H04B 10/00*    (2013.01)

(56) References Cited

OTHER PUBLICATIONS

Partial English Translation and Abstract of Chinese Patent Application No. CN103841474, Jan. 20, 2016, 9 pages.

McGarry, M., et al., "An Evolutionary WDM Upgrade for EPONs," Retrieved from the Internet:URL: http://mre.faculty.asu.edu/EPONupgrade.pdf [retrieved on Apr. 29, 2014], Jan. 1, 2005, 24 pages.

"Draft New Recommendation ITU-T G.989.3, 40-Gigabit-Capable Passive Optical Networks (NG-PON2): Transmission Convergence Layer," International Telecommunication Union Telecommunication Standardization Sector, Study Group 15, TD 289 Rev.3 (PLEN/15), Question 2/15, 2013-2016, 261 pages.

Foreign Communication From a Counterpart Application, PCT Application No. PCT/US2015/027964, English Translation of International Search Report dated Aug. 21, 2015, 5 pages.

Foreign Communication From a Counterpart Application, PCT Application No. PCT/US2015/027964, English Translation of Written Opinion dated Aug. 21, 2015, 8 pages.

Notice of Allowance dated Aug. 15, 2016, 18 pages, U.S. Appl. No. 14/693,602, filed Apr. 22, 2015.

Machine Translation and Abstract of International Publication No. WO2013189321, dated Dec. 27, 2013, 14 pages.

Foreign Communication From a Counterpart Application, Canadian Application No. 2947420, Canadian Office Action dated Jul. 31, 2017, 4 pages.

\* cited by examiner

ROGUE OPTICAL NETWORK UNIT MITIGATION IN PASSIVE OPTICAL NETWORKS

CROSS-REFERENCE TO RELATED APPLICATIONS

This application is a continuation of co-pending U.S. patent application Ser. No. 14/693,602, filed Apr. 22, 2015, by Bo Gao, et al., entitled "Rogue Optical Network Unit Mitigation in Passive Optical Networks," and claims the benefit of U.S. Provisional Patent Application No. 61/986,601, filed Apr. 30, 2014, entitled "Rogue Optical Network Unit (ONU) Mitigation in Passive Optical Networks (PONs)," which are incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile, which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside.

In recent years, time-division multiplexing (TDM) PONs, such as gigabit-capable PONs (GPONs) and Ethernet PONs (EPONs), have been deployed worldwide for multimedia applications. In TDM PONs, the total capacity is shared among multiple users using a time-division multiple access (TDMA) scheme, so the average bandwidth for each user may be limited to below 100 megabits per second (Mb/s).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT. Next-generation PONs (NG-PONs) and NG-PON2s may include point-to-point WDM PONs (P2P-WDM PONs), which may provide data rates higher than 10 Gb/s.

NG-PONs and NG-PON2s may also include time- and wavelength-division multiplexing (TWDM) PONs, which may also provide data rates higher than 10 Gb/s. TWDM PONs may combine TDMA and WDMA to support higher capacity so that an increased number of users can be served by a single OLT with sufficient bandwidth per user. In a TWDM PON, a WDM PON may be overlaid on top of a TDM PON. In other words, different wavelengths may be multiplexed together to share a single feeder fiber, and each wavelength may be shared by multiple users using TDMA.

SUMMARY

In one embodiment, the disclosure includes an OLT comprising a target OLT channel termination (CT), and a source OLT CT in communication with the target OLT CT, wherein the source OLT CT is configured to exchange tuning messages with the target OLT CT to initiate upstream wavelength tuning of an ONU, wherein the source OLT CT is configured to transmit a tuning request to the ONU after the tuning messages have been exchanged and to receive a tuning acknowledgement message from the ONU indicating that the tuning request will be executed, wherein the source OLT CT is configured to transmit a broadcast notification message to all OLT CTs within the OLT, except for the source OLT CT, after receipt of the tuning acknowledge message from the ONU, and wherein the broadcast notification message includes a tuning time of the ONU.

In another embodiment, the disclosure includes an OLT comprising a source OLT CT, and a target OLT CT in communication with the source OLT CT, wherein the target OLT CT is configured to transmit a tuning confirmation message to the source OLT CT after receipt by the target OLT CT of an upstream tuning response message from an ONU indicating that upstream wavelength tuning of the ONU has been completed, wherein the target OLT CT is configured to transmit a broadcast notification message to all OLT CTs in the OLT, except for the target OLT CT, after transmitting the tuning confirmation message, and wherein the broadcast notification message indicates that the upstream wavelength tuning of the ONU is complete.

In yet another embodiment, the disclosure includes a method of tuning an upstream wavelength of an ONU, comprising exchanging tuning messages with a target OLT CT to initiate upstream wavelength tuning of an ONU, transmitting a tuning request to the ONU after the tuning messages have been exchanged and receiving a tuning acknowledgement message from the ONU indicating that the tuning request will be executed; and transmitting a broadcast notification message to all other OLT CTs within the OLT after receipt of the tuning acknowledge message from the ONU, wherein the broadcast notification message includes a tuning time of the ONU.

In yet another embodiment, the disclosure includes another method of tuning an upstream wavelength of an ONU, comprising transmitting a tuning confirmation message to a source OLT CT after receipt of an upstream tuning response message from an ONU indicating that upstream wavelength tuning of the ONU has been completed, and transmitting a broadcast notification message to all other OLT CTs in the OLT after transmitting the tuning confirmation message, wherein the broadcast notification message indicates that the upstream wavelength tuning of the ONU is complete.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
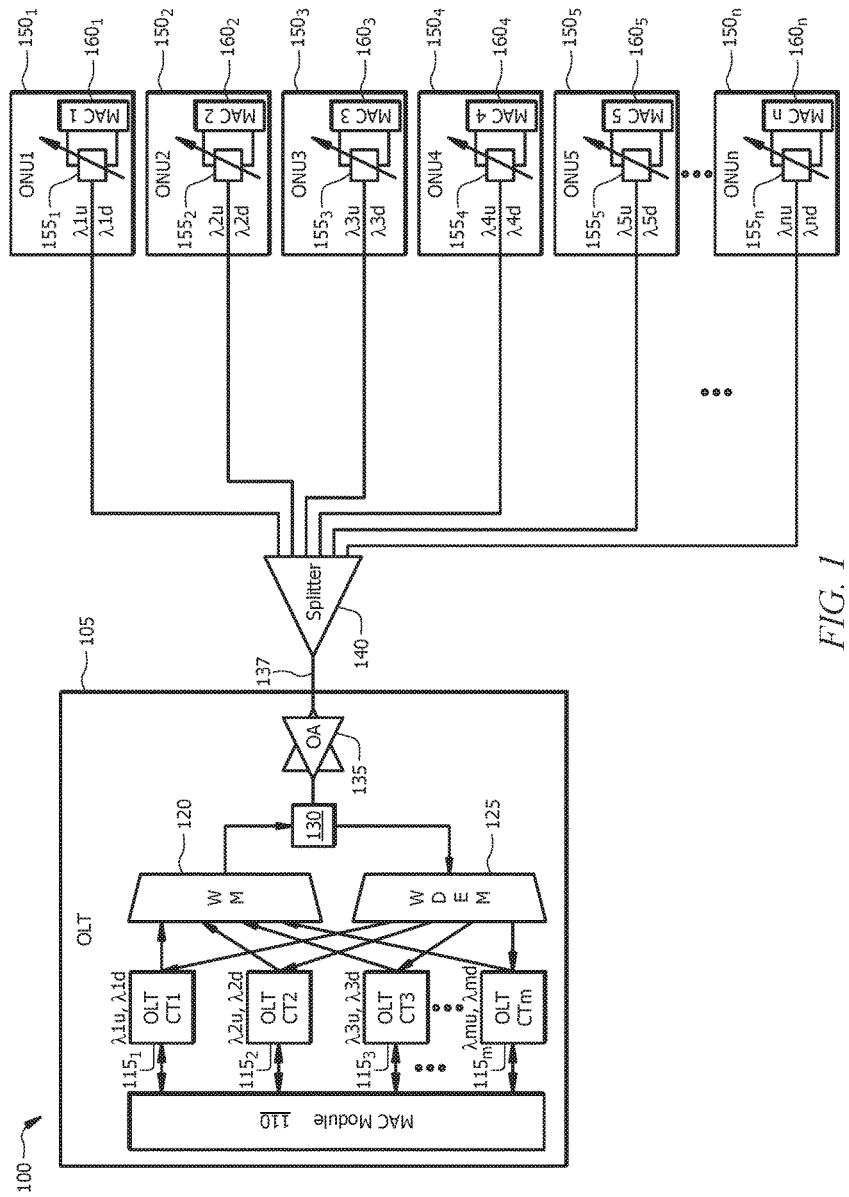
FIG. 1 is a schematic diagram of a TWDM PON.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Prior PON technologies are single-wavelength PONs and employ an OLT with a single OLT channel CT, which is an OLT port communicating with ONUs. Therefore, the prior PON technologies do not support ONU wavelength tuning. NG-PONs and NG-PON2s, including multiple-wavelength PONs such as WDM PONs, P2P-WDM PONs, and TWDM PONs may have multiple OLT CTs in order to support the multiple wavelengths. Each OLT CT may provide data transmission in a pair of upstream and downstream wavelengths. Upstream may refer to the direction of communication from an ONU to the OLT. Downstream, on the other hand, may refer to the direction of communication from the OLT to the ONU. An OLT CT may instruct its corresponding ONUs to tune their upstream wavelengths during operation. The ONU wavelength tunability may help to balance the traffic load in the upstream wavelength channels. The tunability may also help conserve OLT power consumption by tuning ONUs to a limited number of wavelengths and turning off some OLT CTs.

A rogue wavelength tuning may occur when an ONU tunes to a wrong upstream wavelength, in other words, a wavelength different from the destination upstream wavelength demanded by a target OLT CT, which may result in congestion of the upstream transmission. Existing standard draft, International Telecommunication Union Telecommunication Standardization Sector (ITU-T) G.989.3, assumes all the OLT CTs are well coordinated, which is not always true. Additionally, according to ITU-T G.989.3 the ONU wavelength tuning does not require confirmation from the target OLT CT, which makes it difficult to realize the rogue wavelength tuning when it occurs. Rogue wavelength tuning in optical transport network (OTN) may be mitigated utilizing various wavelength-selective components in the optical path to filter out optical signals with the correct upstream wavelength and block optical signals with the wrong upstream wavelengths. However, no such wavelength-selective components are allowed in PONs. Therefore, no rogue wavelength tuning mitigation options are available in PONs technology.

Disclosed herein are embodiments for tuning an upstream wavelength of an ONU. The disclosed embodiments may mitigate the rogue wavelength tuning of the ONU, which may prevent network congestion when the ONU tunes to a wrong upstream wavelength. The source OLT CT transmits a broadcast notification message to all other OLT CTs within the OLT after receipt of a tuning acknowledgement message from the ONU. The target OLT CT transmits a broadcast notification message to all other OLT CTs in the OLT after transmitting the tuning confirmation message, where the broadcast notification message indicates that the upstream wavelength tuning of the ONU is complete. The disclosed embodiments apply inter channel termination protocol (ICTP) to coordinate all OLT CTs during upstream wavelength tuning of the ONU.

FIG. 1 is a schematic diagram of a TWDM PON 100. The TWDM PON 100 may be suitable for implementing the disclosed embodiments. The TWDM PON 100 may be a communications network that does not require any active components to distribute data between an OLT 105 and ONUs$_{1-n}$ 150$_{1-n}$. Instead, the TWDM PON 100 may use passive optical components to distribute data between the OLT 105 and the ONUs$_{1-n}$ 150$_{1-n}$. The TWDM PON 100 may adhere to any standard related to multiple-wavelength PONs. The TWDM PON 100 comprises the OLT 105, a splitter 140, and the ONUs$_{1-n}$ 150$_{1-n}$, where n may be any positive integer.

The OLT 105 may be any device configured to communicate with the ONUs$_{1-n}$ 150$_{1-n}$ and another network. Specifically, the OLT 105 may act as an intermediary between the other network and the ONUs$_{1-n}$ 150$_{1-n}$. For instance, the OLT 105 may forward data received from the network to the ONUs$_{1-n}$ 150$_{1-n}$ and may forward data received from the ONUs$_{1-n}$ 150$_{1-n}$ to the other network. When the other network uses a network protocol that differs from the PON protocol used in the PON 100, the OLT 105 may comprise a converter that converts the network protocol to the PON protocol. The OLT 105 converter may also convert the PON protocol into the network protocol.

The OLT 105 may comprise a media access control (MAC) module 110, OLT CT$_{1-m}$ 115$_{1-m}$, a wavelength multiplexer (WM) 120, a wavelength demultiplexer (WDEM) 125, a local oscillator (LO) 130, and a bi-directional optical amplifier (OA) 135. The MAC module 110 may be any module suitable for processing signals for use at a physical layer in a protocol stack. The WM 120 may be any suitable wavelength multiplexer, such as an arrayed waveguide grating (AWG). The WM 120 may multiplex the wavelength channels and thus combine the signals into a combined transmitted signal, then forward the combined transmitted signal to the LO 130. The LO 130 may add characteristics to the combined transmitted signal in order for the ONUs$_{1-n}$ 150$_{1-n}$ to properly extract the signals. The LO 130 may then forward the combined transmitted signal to the OA 135, which may amplify the combined transmitted signal as needed in order to forward the combined transmitted signal to a splitter 140 via an optical fiber 137. The OA 135 may also receive a combined received signal from the splitter 140 via the optical fiber 137 and amplify the combined received signal as needed in order to forward the combined received signal to the WDEM 125. The WDEM 125 may be similar to the WM 120 and may demultiplex the combined received signal into multiple optical signals, then forward the multiple optical signals to the OLT CT$_{1-m}$ 115$_{1-m}$.

The splitter 140 may be any device suitable for splitting the combined optical signals and forwarding the split signals to the ONUs$_{1-n}$ 150$_{1-n}$. The splitter 140 may also be any device suitable for receiving signals from the ONUs$_{1-n}$ 150$_{1-n}$, combining those signals into a combined received signal, and forwarding the combined received signal to the OA 135.

The ONUs$_{1-n}$ 150$_{1-n}$ may be any devices suitable for communicating with the OLT 105. The ONUs$_{1-n}$ 150$_{1-n}$ may comprise wavelength tunable components 155$_{1-n}$ and MAC modules$_{1-n}$ 160$_{1-n}$. The wavelength tunable components 155$_{1-n}$ comprise wavelength tunable transmitters and wavelength tunable filters (not shown). The MAC modules$_{1-n}$ 160$_{1-n}$ are similar to the MAC module 110.

The PON 100 may provide WDM capability by associating a downstream wavelength and an upstream wavelength with each OLT CT 115$_{1-m}$ so that a plurality of wavelengths are present. The PON 100 may then combine those wavelengths into a single optical fiber 137 and distribute the wavelengths to the ONUs$_{1-n}$ 150$_{1-n}$ through a splitter 140. The PON 100 may provide TDM as well.

Figure 2:
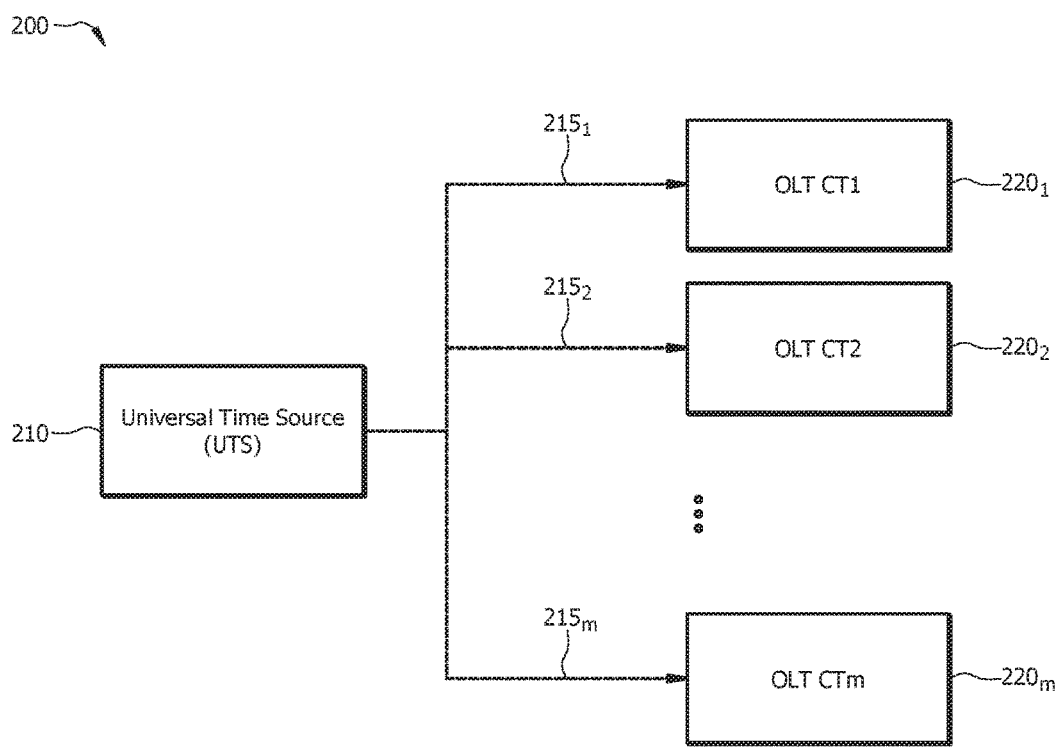
FIG. 2 is a schematic diagram showing synchronization of all OLT CTs.

FIG. 2 is a schematic diagram 200 showing synchronization of all OLT CTs. The synchronization of the OLT CTs 220$_{1-m}$ is a process to make all the OLT CTs 220$_{1-m}$ have the same clock frequency and phase, which should be completed before the upstream wavelength tuning. FIG. 2 shows a universal time source (UTS) 210, OLT CT$_{1-m}$ 220$_{1-m}$ coupled to the UTS 210, and links 215$_{1-m}$ connecting the UTS 210 and the OLT CT$_{1-m}$ 220$_{1-m}$. The OLT CT$_{1-m}$ 220$_{1-m}$ may be the OLT 115$_{1-m}$ 115$_{1-m}$ in FIG. 1. The UTS 210 is configured to synchronize the OLT CTs 220$_{1-m}$ and allow all the OLT CT$_{1-m}$ 220$_{1-m}$ to have the same clock frequencies as the UTS 210 and the same phases, which are the phase of the UTS 210 plus extra phases from the links 115$_{1-m}$. Since the links 215$_{1-m}$ have equal lengths, all the OLT CTs 220$_{1-m}$ should have the same frequencies and the same phase after the synchronization.

Figure 3:
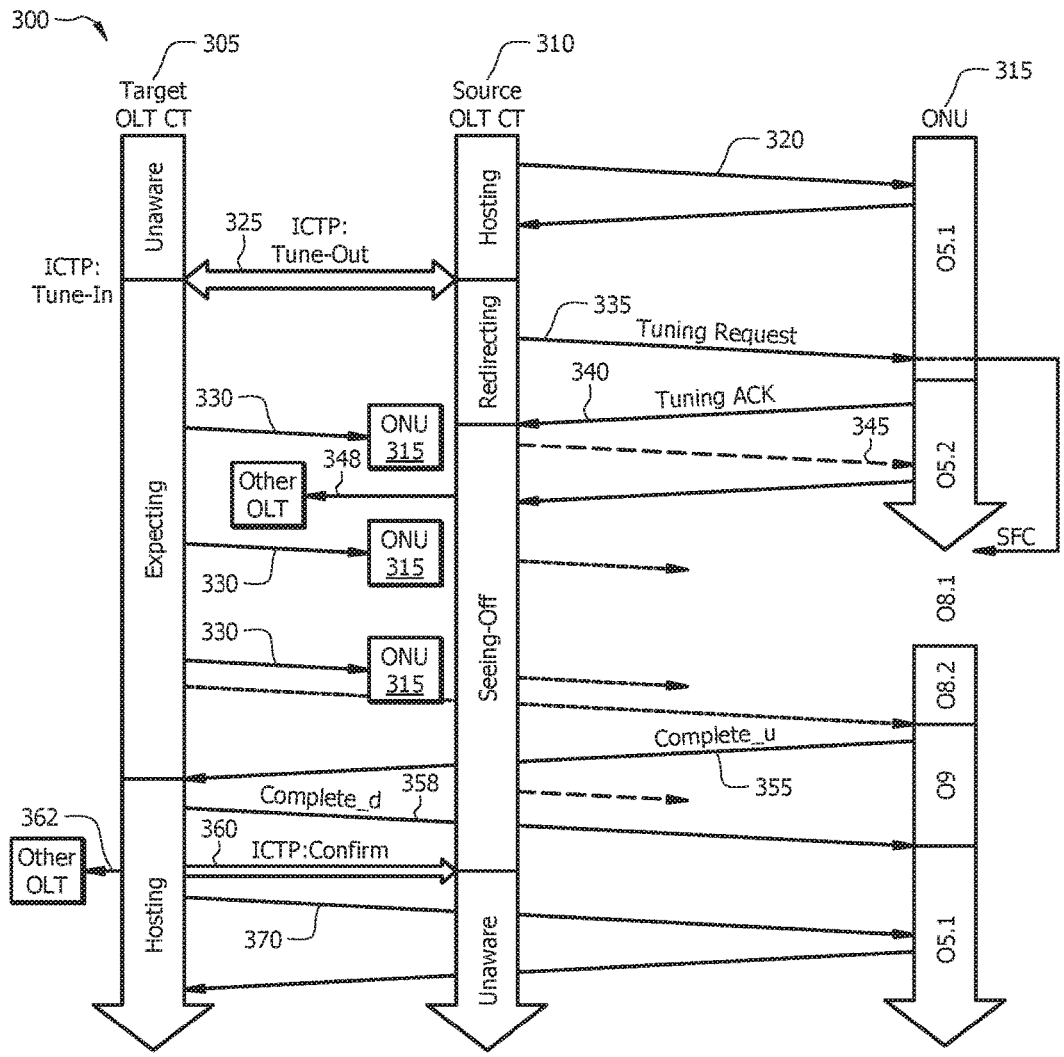
FIG. 3 is a sequence diagram illustrating upstream wavelength tuning of an ONU.

FIG. 3 is a sequence diagram 300 illustrating upstream wavelength tuning of an ONU. The upstream wavelength tuning may be implemented in the TWDM PON 100. The sequence diagram 300 illustrates messages exchanged between a source OLT CT 310, a target OLT CT 305, and an ONU 315. The ONU 315 may be any one of the ONU 150$_{1-n}$. The source OLT CT 310 and the target OLT CT 305 may be any two different OLT CTs 115$_{1-m}$ in FIG. 1. The source OLT CT 310 is the OLT CT with which the ONU 315 exchanges optical signals before the upstream wavelength tuning of the ONU 315. The target OLT CT 305 is the OLT CT with which the ONU 315 exchanges optical signals after the upstream wavelength tuning of the ONU 315.

The ONU 315 exchanges optical signals 320 with the source OLT CT 310. For example, the source OLT CT 310 sends downstream optical signals 320 to the ONU 315 and receives upstream optical signals 320 from the ONU 315. The ONU 315 sends the upstream optical signals 320 to the source OLT CT 310 and receives the downstream optical signals 320 from the source OLT CT 310.

The source OLT CT 310 exchanges tuning messages 325 with the target OLT CT 305 to initiate the upstream wavelength tuning of an ONU 315. The tuning messages 325 are transmitted between the source OLT CT 310 and the target OLT CT 305 via the ICTP. The tuning messages 325 are tune-out messages for the source OLT CT 310 indicating that the source OLT CT 310 will stop exchanging optical signals with the ONU 315 after the upstream wavelength tuning of the ONU. The tuning messages 325 are tune-in messages for the target OLT CT 305 indicating that the target OLT CT 310 will exchange optical signals with the ONU 315 after the upstream wavelength tuning of the ONU 315.

Parameters of the tuning messages 325 are described in Table 1 as shown below. In an embodiment, the tuning messages 325 comprise the OLT CT identification (ID), a message type ID, a sequence number or Broadcast Sequence number (SeqNo), the ONU ID, a destination upstream wavelength ID or destination OLT port ID, an upstream start count, a start time, and a length.

TABLE 1

The tuning messages between the source OLT CT and the target OLT CT.

| Octet | Content | Description |
|---|---|---|
| 1 | OLT CT ID | Broadcast to other all OLT ports or Directed message to one OLT port. |
| 2 | Message type ID | Message type ID "notice". |
| 3 | SeqNo | Sequence number or Broadcast Sequence number. |
| 4 – m | ONU ID | The ONU to conduct wavelength tuning. |
| (m + 1)–n | Destination upstream wavelength ID or destination OLT port ID | The upstream wavelength channel or OLT port which ONU will tune to. |
| (n + 1)–o | Upstream start count | The time when ONU upstream wavelength tuning starts. |
| (o + 1)–p | Start time | ONU burst transmission start time. |
| (p + 1)–q | Length | ONU burst size. |
| (q + 1)–r | TBD | |

The ONU ID refers to the ONU which tunes the upstream wavelength, for example, ONU 315. The start time refers to the start time of sending an upstream tuning response (complete_u) message 355, as described below. The length refers to the number of bits that the complete_u message 355 contains.

The target OLT CT 305 sends messages 330 to the ONU 315 in preparation for exchanging optical signals with the ONU 315. The messages 330 may include necessary data structures of the target OLT CT 305 and periodic physical layer operation, administration, and maintenance (PLOAM) grants which permit the ONU 315 to send messages to the target OLT CT 305. The source OLT CT 310 transmits a tuning request 335 to the ONU after the tuning messages 330 have been exchanged. The tuning request 335 is configured to request the upstream wavelength tuning of the ONU and may comprise the wavelength value that the ONU tunes the upstream wavelength to.

The ONU 315 sends a tuning acknowledgement message 340 to the source OLT CT 310 indicating that the tuning request will be executed. After receipt of the tuning acknowledgement message 340 from the ONU 315, the source OLT CT 310 transmits a broadcast notification message 348 to all OLT CTs within the OLT, except for the source OLT CT 310. The broadcast notification message 348 includes a tuning time of the ONU, which comprises a start time of the upstream wavelength tuning of the ONU 315 and a start time of sending the complete_u message from the ONU 315 to the target OLT CT after the ONU 315 finishes the upstream wavelength tuning. After receipt of the broadcast notification message 348, all OLT CTs within the OLT except the source OLT CT 310 stop receiving upstream optical signals until the ONU 315 completes the upstream wavelength tuning. The ONU 315 may send a tuning response PLOAM message to the source OLT CT 310 when the ONU 315 rejects the tuning request for some reason.

The source OLT CT 310 continues to transmit the PLOAM grants 345 to the ONU 315, which permits the ONU 315 to send messages to the source OLT CT 310. After the ONU completes the requested tuning, the ONU 315 transmits the complete_u message 355 to the target OLT CT 305 indicating that upstream wavelength tuning of the ONU 315 has been completed. The complete_u message 335 is a PLOAM message. When the ONU 315 fails to tune the upstream wavelength, the ONU 315 tunes the upstream wavelength of the ONU 315 back to the value before the upstream wavelength tuning and transmits a tuning response rollback PLOAM message to the source OLT CT 310 instead of the complete_u message 355 to indicate that the upstream wavelength tuning of the ONU 315 failed.

The target OLT CT 305 receives and processes the complete_u message 355, transmits a downstream tuning control (complete_d) message 358 to the ONU 315 and a tuning confirmation message 360 to the source OLT CT 310 indicating that upstream wavelength tuning of the ONU has been completed. After transmitting the tuning confirmation message 360, the target OLT CT 305 transmits a broadcast notification message 362 to all OLT CTs in the OLT, except for the target OLT CT 305 indicating the upstream wavelength tuning of the ONU 315 is complete. In an embodiment, the complete$_{13}$d message 358 and the tuning confirmation message 360 are PLOAM messages. In an embodiment, the tuning confirmation message 360 is transmitted via the ICTP protocol.

Parameters of the tuning confirmation message 360 are described in Table 2 as shown below. In an embodiment, the tuning confirmation message 360 includes an OLT CT ID, a message type ID, a SeqNo, an ONU ID, and a result. The OLT CT ID indicates the source OLT CT 310. The ONU ID indicates the ONU that tunes the upstream wavelength, for example ONU 315. The result indicates the upstream wavelength tuning result of the ONU 315. The result may be 0 indicating the upstream wavelength tuning of the ONU succeeds, 1 indicating the upstream wavelength tuning of the ONU fails, and 2 indicating the upstream wavelength of the ONU needs to roll back to the upstream wavelength before the upstream wavelength tuning.

TABLE 2

The tuning confirmation message from the target OLT CT to the source OLT CT.

| Octet | Content | Description |
|---|---|---|
| 1 | OLT CT ID | Broadcast to other all OLT ports or Directed message to one OLT port. |
| 2 | Message type ID | Message type ID "notice". |
| 3 | SeqNo | Sequence number or Broadcast Sequence number. |
| 4~s | ONU ID | The ONU having conducted wavelength tuning. |
| (s + 1)~t | Result | ONU upstream wavelength tuning result; 0-OK, 1-fail, 2-rollback, . . . |
| (u + 1)~v | TBD | |

If the target OLT CT 305 doesn't receive the complete_u message 355 within a specific period of time, this indicates that the ONU 315 tunes to a wrong upstream wavelength. The target OLT CT 305 may transmit a tuning confirmation message in which the result equals to 1 to the other OLT CTs indicating the upstream wavelength tuning of the ONU 315 fails and therefore the rogue wavelength tuning occurs. Several possible mitigation options may comprise instructing the ONU 315 to roll back the upstream wavelength to the value before the upstream wavelength tuning, deactivating the ONU 315 after a specific period of time, instructing the ONU 315 to retry the upstream wavelength tuning.

The source OLT CT 310 stops transmitting messages to the ONU 315. The ONU 315 exchanges optical signals 370 with the target OLT CT 305. For example, the target OLT CT 305 sends downstream optical signals 370 to the ONU 315 and receives upstream optical signals 370 from the ONU 315 now that the ONU 315 has been appropriately tuned. The ONU 315 sends the upstream optical signals to the target OLT CT 305 and receives the downstream optical signals from the target OLT CT 305.

Figure 4:
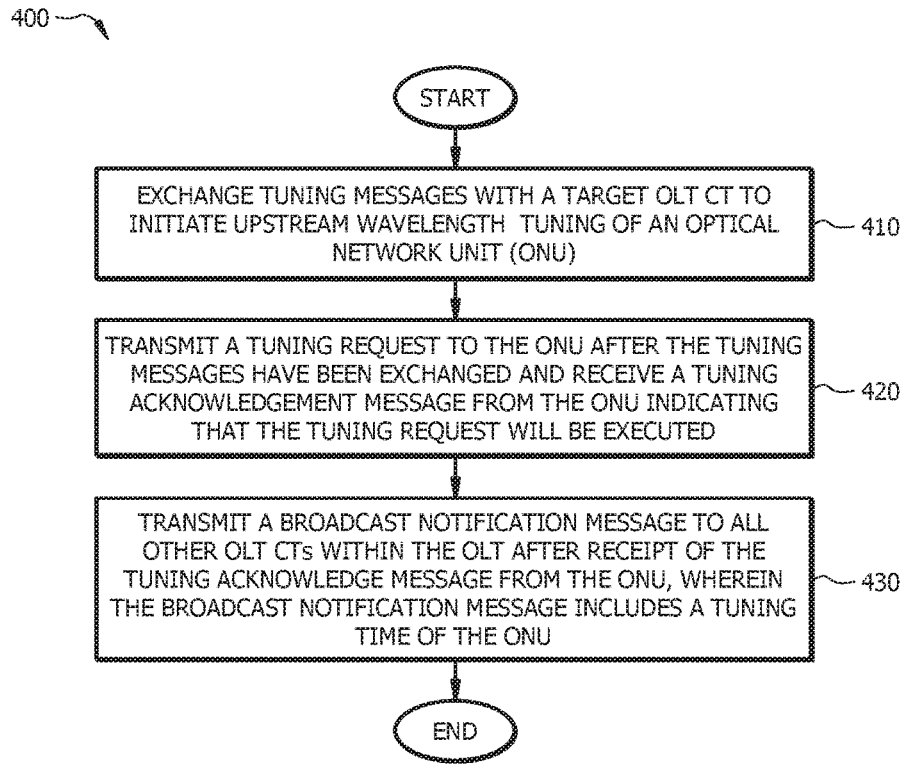
FIG. 4 is a flow chart illustrating a method of tuning an upstream wavelength of the ONU according to an embodiment of the disclosure.

FIG. 4 is a flowchart illustrating a method 400 of tuning an upstream wavelength of the ONU according to an embodiment of the disclosure. The method 400 is implemented in a source OLT CT in order to hand over communication with the ONU from the source OLT CT to a target OLT CT. The source OLT CT, the target OLT CT, and the ONU may be the source OLT CT 310, the target OLT CT 305, and the ONU 315. In block 410, tuning messages are exchanged with the target OLT CT to initiate upstream wavelength tuning of an ONU. In block 420, a tuning request is transmitted to the ONU after the tuning messages have been exchanged and a tuning acknowledgement message is received from the ONU indicating that the tuning request will be executed. In block 430, a broadcast notification message is transmitted to all other OLT CTs within the OLT after receipt of the tuning acknowledge message from the ONU, wherein the broadcast notification message includes a tuning time of the ONU.

Figure 5:
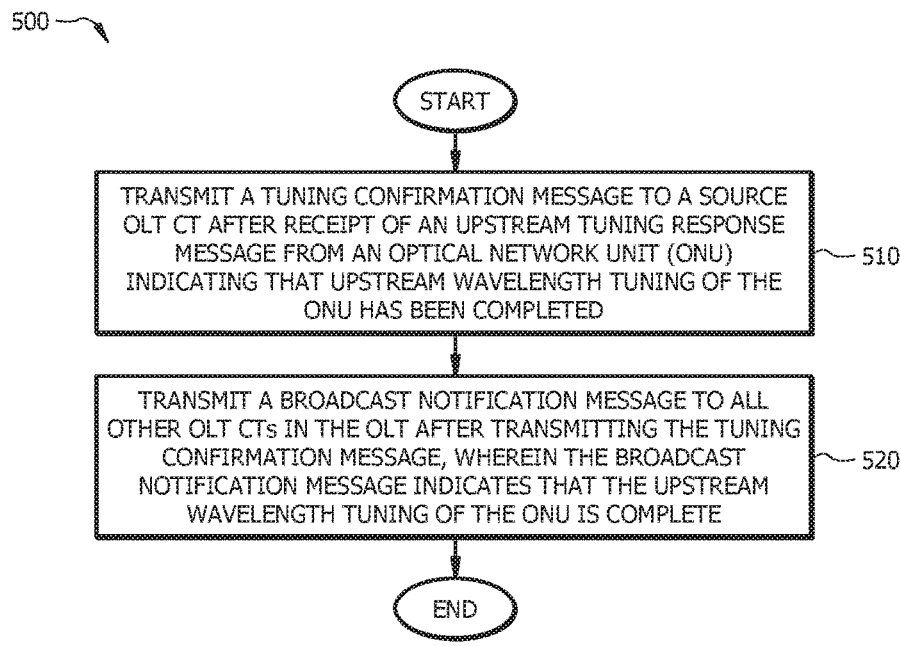
FIG. 5 is a flow chart illustrating a method of tuning the upstream wavelength of the ONU according to another embodiment of the disclosure.

FIG. 5 is a flowchart illustrating a method 500 of tuning the upstream wavelength of the ONU according to another embodiment of the disclosure. The method 500 is implemented in the target OLT CT in order to hand over the communication with the ONU from the source OLT CT to the target OLT CT. The source OLT CT, the target OLT CT, and the ONU may be the source OLT CT 310, the target OLT CT 305, and the ONU 315. In block 510, a tuning confirmation message is transmitted to a source OLT CT after receipt of an upstream tuning response message from an ONU indicating that upstream wavelength tuning of the ONU has been completed. In block 520, a broadcast notification message is transmitted to all other OLT CTs in the OLT after transmitting the tuning confirmation message, wherein the broadcast notification message indicates that the upstream wavelength tuning of the ONU is complete.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT) comprising:
a first OLT channel termination (CT);
a target OLT CT; and a source OLT CT in communication with the first OLT CT and the target OLT CT, wherein the source OLT CT is configured to:
  transmit a tuning request to an optical network unit (ONU);
  receive a tuning acknowledgement message from the ONU indicating that the tuning request will be executed; and
  transmit a broadcast notification message comprising a tuning time of the ONU to at least the first OLT CT and the target OLT CT after receipt of the tuning acknowledge message from the ONU.

2. The OLT of claim 1, wherein the tuning time of the ONU comprises a start time of an upstream wavelength tuning of the ONU and a start time of sending an upstream tuning response message from the ONU to the target OLT CT.

3. The OLT of claim 1, wherein the tuning acknowledgement message comprises:
  an ONU identification (ID) indicating the ONU which tunes an upstream wavelength of the ONU;
  a start time of sending an upstream tuning response message from the ONU to the target OLT CT; and
  a length indicating the length of the upstream tuning response message.

4. The OLT of claim 3, wherein the upstream tuning response message is a physical layer operation, administration and maintenance (PLOAM) message.

5. The OLT of claim 4, wherein the source OLT CT is configured to transmit PLOAM grants to the ONU to permit the ONU to send messages to the source OLT CT.

6. The OLT of claim 1, wherein the source OLT CT and the target OLT CT exchange tuning messages with each other to initiate upstream wavelength tuning of the ONU.

7. The OLT of claim 1, wherein the source OLT CT is configured to send the broadcast notification message to all remaining OLT CTs within the OLT.

8. An optical line terminal (OLT) comprising:
  a first OLT channel termination (CT);
  a source OLT CT; and
  a target OLT CT in communication with the first OLT CT and the source OLT CT, wherein the target OLT CT is configured to:
    transmit a tuning confirmation message to the source OLT CT after receipt by the target OLT CT of an upstream tuning response message from an optical network unit (ONU) indicating that upstream wavelength tuning of the ONU has been completed; and
    transmit a broadcast notification message indicating that the upstream wavelength tuning of the ONU is complete to at least the first OLT CT and the source OLT CT after transmitting the tuning confirmation message.

9. The OLT of claim 8, wherein the tuning confirmation message comprises:
  an OLT CT identification (ID) indicating the source OLT CT;
  an ONU ID indicating the ONU which tunes an upstream wavelength of the ONU; and
  a result of the upstream wavelength tuning of the ONU.

10. The OLT of claim 8, wherein the target OLT CT is configured to transmit a downstream tuning control message to the ONU to confirm the upstream wavelength tuning of the ONU is complete after the receipt of the upstream tuning response message from the ONU.

11. The OLT of claim 10, wherein the upstream tuning response message and the downstream tuning control message are physical layer operation, administration, and maintenance (PLOAM) messages.

12. The OLT of claim 8, wherein the broadcast notification message and the tuning confirmation message are transmitted via an inter channel termination protocol (ICTP).

13. The OLT of claim 8, wherein the target OLT CT is configured to transmit the broadcast notification message to all remaining OLT CTs within the OLT.

14. A method of tuning an upstream wavelength of an optical network unit (ONU) implemented in a source optical line terminal (OLT) channel termination (CT), comprising:
  exchanging tuning messages with a target OLT CT to initiate upstream wavelength tuning of the ONU;
  transmitting a tuning request to the ONU after the tuning messages have been exchanged; and
  transmitting a broadcast notification message comprising a tuning time of the ONU to the target OLT CT and at least one other OLT after receipt of the tuning acknowledge message from the ONU.

15. The method of claim 14, wherein the tuning time of the ONU comprises a start time of the upstream wavelength tuning of the ONU and a start time of sending an upstream tuning response message from the ONU to the target OLT CT after the ONU finishes the upstream wavelength tuning.

16. The method of claim 14, wherein the tuning messages comprises:
  an ONU identification (ID) indicating the ONU which tunes the upstream wavelength;
  a start time indicating the start time of sending the upstream tuning response message from the ONU to the target OLT CT; and
  a length indicating the length of the upstream tuning response message.

17. The method of claim 14, further comprising transmitting physical layer operation, administration and maintenance (PLOAM) grants to the ONU which permit the ONU to send messages to the source OLT CT after transmitting the broadcast notification message.

18. A method of tuning an upstream wavelength of an optical network unit (ONU) implemented by a target optical line terminal (OLT) channel termination (CT), comprising:
  transmitting a tuning confirmation message to a source OLT CT after receipt of an upstream tuning response message from an ONU indicating that upstream wavelength tuning of the ONU has been completed; and
  transmitting a broadcast notification message indicating that the upstream wavelength tuning of the ONU is complete to the source OLT CT and at least one other OLT CT after transmitting the tuning confirmation message.

19. The method of claim 18, wherein the tuning confirmation message comprises:
  an OLT CT identification (ID) indicating the source OLT CT;
  an ONU ID indicating the ONU which tunes the upstream wavelength; and
  a result indicating the upstream wavelength tuning status of the ONU.

20. The method of claim 18, further comprising transmitting a downstream tuning control message to the ONU to confirm the upstream ONU wavelength tuning is complete after the receipt of the upstream tuning response message from the ONU.

* * * * *